US012360368B2

(12) United States Patent
Jamali et al.

(10) Patent No.: US 12,360,368 B2
(45) Date of Patent: Jul. 15, 2025

(54) POLARIZATION-SELECTIVE VARIFOCAL LIQUID LENS

(71) Applicant: Meta Platforms Technologies, LLC, Menlo Park, CA (US)

(72) Inventors: Afsoon Jamali, Redmond, WA (US); Changwon Jang, Bellevue, WA (US); Sandro Pintz, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 394 days.

(21) Appl. No.: 17/231,824

(22) Filed: Apr. 15, 2021

(65) Prior Publication Data

US 2022/0334393 A1 Oct. 20, 2022

(51) Int. Cl.
*G02B 27/01* (2006.01)
*G02B 3/14* (2006.01)
*G02B 5/30* (2006.01)
*G02B 26/00* (2006.01)

(52) U.S. Cl.
CPC ........... *G02B 27/0172* (2013.01); *G02B 3/14* (2013.01); *G02B 5/3016* (2013.01); *G02B 26/004* (2013.01)

(58) Field of Classification Search
CPC .... G02B 27/0172; G02B 3/14; G02B 5/3016; G02B 26/004; G02B 26/005; G02B 27/286
See application file for complete search history.

(56) References Cited

U.S. PATENT DOCUMENTS

| | | | | |
|---|---|---|---|---|
| 2006/0238895 | A1* | 10/2006 | Clauss | G02B 27/0068 359/736 |
| 2015/0241608 | A1* | 8/2015 | Shian | G02B 3/14 359/666 |
| 2015/0315012 | A1* | 11/2015 | Wiersma | G02B 26/004 349/24 |
| 2021/0072821 | A1* | 3/2021 | von und zu Liechtenstein | G06F 3/012 |
| 2021/0405374 | A1* | 12/2021 | Komanduri | G02B 27/4261 |

OTHER PUBLICATIONS

Hong et al., "See-through optical combiner for augmented reality head-mounted display: index-matched anisotropic crystal lens" Scientific Reports published Jun. 5, 2017.

* cited by examiner

*Primary Examiner* — Mariam Qureshi
(74) *Attorney, Agent, or Firm* — Greenberg Traurig, LLP (57) ABSTRACT

A varifocal liquid lens includes a body filled with two different fluids separated by an interface of a variable curvature across a clear aperture of the varifocal liquid lens. At least one of the first or second fluids is birefringent, such that a refractive index difference between the first and second fluids and resulting optical power of the varifocal liquid lens is dependent on polarization of impinging light. At a first light polarization, the first and second fluids may be matched in refractive index, while at a second, orthogonal light polarization, the first and second fluids may be mismatched in refractive index, whereby the first interface between the first and second fluids may have a variable, non-zero optical power for the second polarization while having a substantially non-variable, zero optical power for the first polarization of light.

10 Claims, 7 Drawing Sheets

POLARIZATION-SELECTIVE VARIFOCAL LIQUID LENS

TECHNICAL FIELD

The present disclosure relates to optical devices, and in particular to varifocal lenses usable e.g. in visual display systems.

BACKGROUND

Visual displays provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems are intended for individual users.

An artificial reality system generally includes a near-eye display (e.g., a headset or a pair of glasses) configured to present content to an individual user. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by seeing through a "combiner" component. The combiner of a wearable display is typically transparent to external light but includes some light routing optic to direct the display light into the user's field of view.

Compact display devices are desired for head-mounted displays. Because a display of HMD or NED is usually worn on the head of a user, a large, bulky, unbalanced, and/or heavy display device would be cumbersome and may be uncomfortable for the user to wear. Compact display devices require compact and efficient light sources, image projectors, lightguides, focusing and redirecting optics, and so on.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

In an AR near-eye display, artificially created imagery is superimposed onto a view of outside environment, augmenting the outside view with artificial objects, indicators, information, etc. Such a display may have a combiner element that combines outside light with image light generated by the display. The combiner element is placed in front of user's eye. The combiner element may include, for example, a pupil-replicating waveguide that guides the image light within a transparent or translucent plate placed in front of the user's eye, out-coupling portions of the image light at different locations of the waveguide towards the user's eye. Since the waveguide plate is transparent or translucent, outside world may be observed simultaneously with viewing the artificially generated imagery.

Some AR display configurations use variable focusing of the image light to properly display objects in 3D space. To that end, a varifocal lens may be placed between the waveguide of a translucent display and the eye viewing the image generated by the display. This creates a problem for viewing outside world, because the varifocal lens is placed in the common optical path of the image light and the outside light, and varying the focus by the varifocal lens will affect the outside world view. To overcome this deleterious effect, a "counter-lens" may be placed in an optical path of the outside light upstream of the translucent display. Optical power i.e. focusing/defocusing power of the counter-lens may be adjusted to be equal with opposite sign to the optical power of the varifocal lens to cancel its focusing power, thereby keeping the views of the outside world in proper focus. This solution is not optimal because it requires a varifocal counter-lens (i.e. an extra varifocal lens) that needs to be operated in perfect synchronism to the varifocal ocular-side lens. Any time lag between operation of these two lenses will momentarily bring the view of outside world out of focus.

In accordance with the present disclosure, optical paths of the outside light and the image light may be isolated from one another by polarization. The combiner element may be made to operate in a single polarization of light while being substantially transparent in the other, orthogonal polarization. The outside light is polarized at the orthogonal polarization. The varifocal ocular lens may also be made polarization-selective, so as not to impact the outside light at the orthogonal polarization, obviating the need for a counter-lens upstream of the translucent display or combiner element. A liquid lens of this disclosure is a varifocal polarization-selective lens. This lens can be used in AR displays, or in any other suitable devices and applications.

In accordance with the present disclosure, there is provided a varifocal liquid lens comprising a body filled with first and second fluids separated by a first interface, the first interface having a variable curvature across a clear aperture of the varifocal liquid lens. At least one of the first or second fluids is birefringent, such that a refractive index difference between the first and second fluids and resulting optical power of the varifocal liquid lens is polarization-dependent. By way of a non-limiting example, at a first polarization of light propagating through the clear aperture, the first and second fluids may be matched in refractive index, while at a second, orthogonal polarization, the first and second fluids may be mismatched in refractive index, such that the first interface between the first and second fluids has a variable, non-zero optical power for the second polarization of light while having a substantially non-variable, zero optical power for the first polarization of light. The first and second fluids may be separated by a second interface; the second interface may be coaxial with the first interface and may also have a variable curvature across the clear aperture. The second fluid may be birefringent and may surround the first fluid, which may be isotropic, or vice versa. In some embodiments, the second fluid may include a polymer-stabilized liquid crystal (LC) and/or an LC elastomer, for example.

In embodiments where the first interface comprises an elastic membrane, the latter may include an electrically responsive polymer layer for changing a radius of curvature of the elastic membrane by applying an electric field to the electrically responsive polymer layer. The elastic membrane may also be configured to change its radius of curvature by application of mechanical force to a perimeter of the elastic membrane. In embodiments where the first and second fluids are immiscible, the first interface may include a boundary between the immiscible first and second fluids.

In accordance with the present disclosure, there is provided a varifocal liquid lens comprising first and second liquid lens components having an interface between them. The interface extends across a clear aperture of the varifocal liquid lens and had a curvature variable within a curvature range by applying a control signal. The first and second liquid lens components comprise first and second fluids, respectively. At least one of the first or second fluids is birefringent, such that: for a first light beam having a first polarization state, the first and second liquid lens components are index-matched, whereby the interface has a substantially zero optical power for the first light beam at any curvature of the interface within the curvature range; and for a second light beam having a second polarization state orthogonal to the first polarization state, the first and second liquid lens components are index-mismatched, whereby the interface has a substantially non-zero optical power for the second light beam, the non-zero optical power depending on the curvature of the interface within the curvature range.

In some embodiments, the first fluid is isotropic and has a first refractive index, and the second fluid is anisotropic and has an ordinary refractive index and an extraordinary refractive index. The ordinary refractive index of the second fluid may be matched to the first refractive index e.g. to within 0.05 or better. In embodiments where the interface comprises an elastic membrane, the latter may include an electrically responsive polymer layer for changing a radius of curvature of the elastic membrane by applying an electric field to the electrically responsive polymer layer. In some embodiments, elastic membrane may be configured to change its radius of curvature by application of mechanical force to a perimeter of the elastic membrane. In embodiments where the first and second fluids are immiscible, the interface may include a boundary between the immiscible first and second fluids.

In accordance with the present disclosure, there is further provided a near-eye display device comprising a polarization-selective display module for providing image light at a first polarization while propagating therethrough external light at a second, orthogonal polarization, the image light carrying an image to be displayed by the near-eye display device. A polarization-selective varifocal liquid lens in disposed an optical path downstream of the polarization-selective display module, for focusing or defocusing the image light at the first polarization while propagating the external light at the second polarization substantially without focusing or defocusing. The polarization-selective varifocal liquid lens comprises a body filled with first and second fluids separated by an interface between them. The interface has a variable curvature across a clear aperture of the polarization-selective varifocal liquid lens. At least one of the first or second fluids is birefringent, such that a refractive index difference between the first and second fluids and resulting optical power of the interface is polarization-dependent. The near-eye display may further include a polarizer in an optical path upstream of the polarization-selective display module, for polarizing the external light to have the second polarization. Due to separation of the optical paths by polarization, the near-eye display may lack a varifocal lens in an optical path of the external light upstream of the polarization-selective display module. The polarization-selective display module may include a polarization-selective pupil-replicating waveguide for expanding the image light at the first polarization across the clear aperture of the polarization-selective varifocal liquid lens.

Figure 1A:
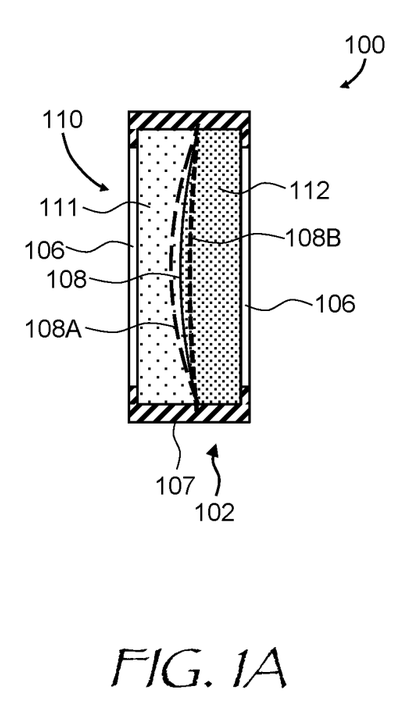
FIG. 1A is a side cross-sectional view of a polarization-selective varifocal liquid lens of this disclosure.
Figure 1B:
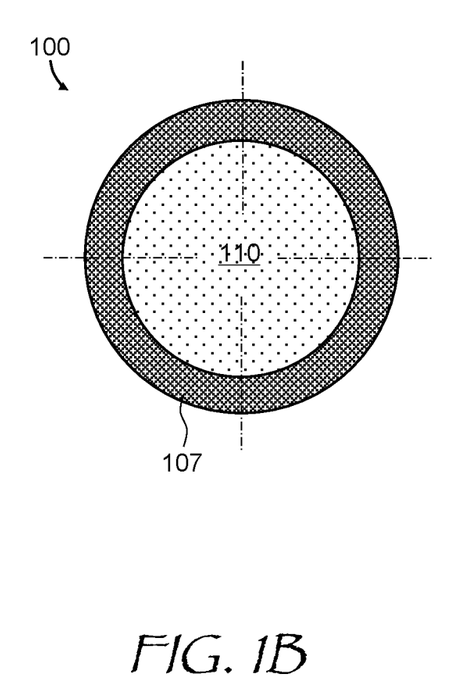
FIG. 1B is a frontal view of the polarization-selective varifocal liquid lens of FIG. 1A.

Referring now to FIGS. 1A and 1B, a varifocal liquid lens 100 includes a body 102 having a pair of windows 106 mounted in a round wall 107. The cavity between the windows is filled with first 111 and second 112 fluids separated by an interface 108 between the first 111 and second 112 fluids. The interface 108 has a variable curvature across a clear aperture 110 of the varifocal liquid lens 100. The interface 108 extends across the clear aperture 110 of the varifocal liquid lens 100 and has a curvature that may be varied within a curvature range by applying some control signal such as voltage, current, pressure, etc. For example, the interface 108 may change shape between approximately spherical shapes 108A and 108B having different radiae of curvature when a control signal is applied. The first 111 and second 112 fluids form respective first and second lens components having the interface 108 between them.

To provide polarization-selective performance of the lens 100, at least one of the first 111 or second 112 fluids of the lens 100 can be made optically birefringent, such that a refractive index difference between the first 111 and second 112 fluids and resulting optical power of the interface 108 of the varifocal liquid lens 100 is polarization-dependent. For instance, at a first polarization of light propagating through the clear aperture 110, the first 111 and second 112 fluids may be matched in refractive index, whereas at a second, orthogonal polarization of light propagating through the clear aperture 110, the first 111 and second 112 fluids may be mismatched in refractive index. Due to the birefringence-caused polarization-selective index matching, the interface 108 between the first 111 and second 112 fluids has a variable, non-zero optical power (i.e. focusing or defocusing power) for the second polarization of light, while having a substantially non-variable, zero optical power for the first polarization of light.

Figure 2A:
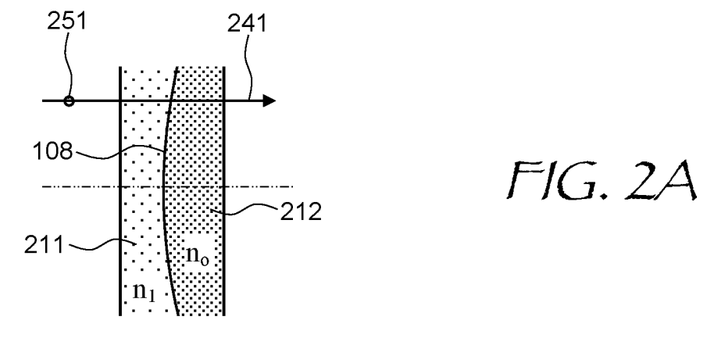
FIG. 2A is a schematic view showing light propagation through the lens of FIGS. 1A and 1B at a first polarization.
Figure 2B:
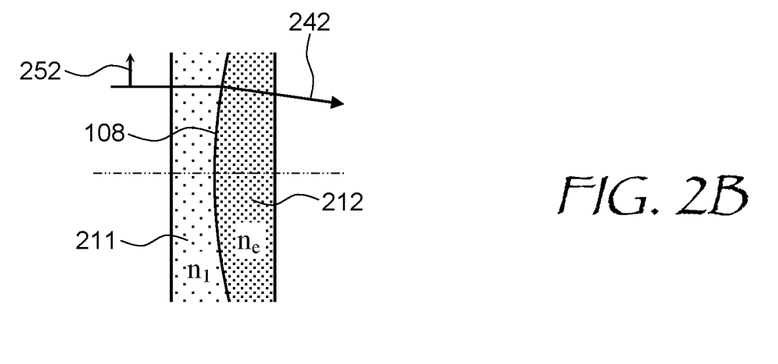
FIG. 2B is a schematic view showing light propagation through the lens of FIGS. 1A and 1B at a second polarization orthogonal to the first polarization.

The patter point is illustrated in FIGS. 2A and 2B. For certainty, a first liquid lens component 211 may be isotropic with a refractive index $n_1$, and a second liquid lens component 212 may be anisotropic, i.e. birefringent, with ordinary $n_O$ and extraordinary $n_O$ refractive indices; in this example, $n_1=n_O$ to within e.g. 0.05 or better. For a first light beam 241 having a first linear polarization state 251 perpendicular to the plane of FIG. 2A, the first 211 and second 212 liquid lens components are index-matched, whereby the interface 108 between them has a substantially zero optical power for the first light beam 241 at any curvature of the interface 108 in the curvature range defined by the shapes 108A and 108B (FIG. 1A). This causes the first light beam 241 to propagate straight through the lens as it would propagate through a plano-parallel slab of a transparent material. For a second light beam 242 (FIG. 2B) having a second linear polarization state 252 orthogonal to the first linear polarization state 251, i.e. in the plane of FIG. 2B, the first 211 and second 212 liquid lens components are index-mismatched, whereby the interface 108 has a substantially non-zero optical power for the second light beam 242, causing the second light beam 242 to refract at the interface 108. The non-zero optical power depends on the curvature of the interface 108 in the curvature range defined by the shapes 108A and 108B.

In embodiments where the first and second indices of refraction are not matched for the first polarization, a refractive index difference between the first 111 and second 112 fluids and resulting optical power of the varifocal liquid lens 100 is polarization-dependent. In such embodiments, the windows 604 may be made non-flat i.e. curved to offset a non-zero optical power of the interface 108 of the varifocal liquid lens 100 at the first polarization. The curved windows may have uniform or laterally varying thickness.

Figure 3A:
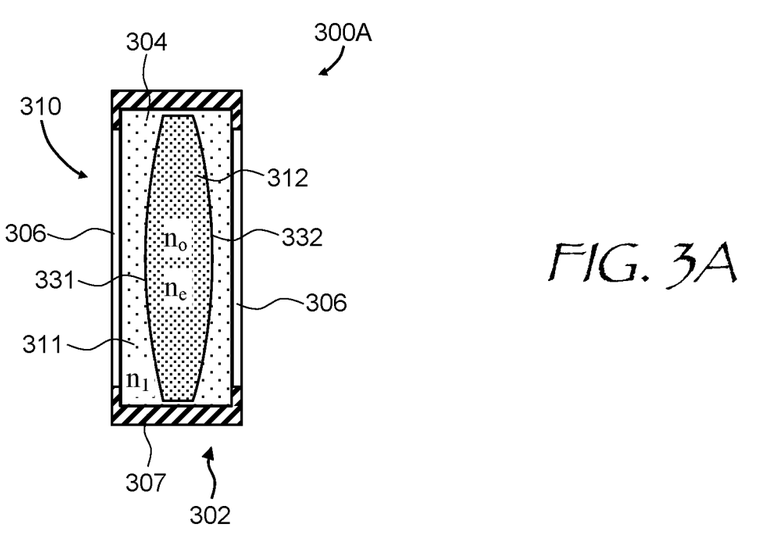
FIG. 3A is side cross-sectional view of a polarization-selective varifocal liquid lens of this disclosure including two surfaces of variable curvature, where the outside fluid is birefringent and the inside fluid is isotropic.

Referring to FIG. 3A, a varifocal liquid lens 300A is similar to the varifocal liquid lens 100 of FIGS. 1A and 1B. The varifocal liquid lens 300A includes a body 302 having a cavity 304 defined e.g. by a pair of windows 306 mounted in a cylindrical wall 307. The cavity 304 is filled with first 311 and second 312 fluids separated by first 331 and second 332 coaxial interfaces between the first 311 and second 312 fluids. The first 331 and second 332 coaxial interfaces have a variable radiae of curvature across a clear aperture 310 of the varifocal lens 300A. In the embodiment shown in FIG. 3A, the second fluid 312 surrounds the first fluid 311. The second fluid 312 is birefringent, having an ordinary refractive index $n_o$ for linearly polarized light with electric vector pointing perpendicular to the plane of FIG. 3A, and an extraordinary refractive index $n_e$ for linearly polarized light with electric vector pointing parallel to the plane of FIG. 3A.

The first fluid 311 is isotropic, i.e. non-birefringent, having an isotropic refractive index $n_1$, which may be matched to the ordinary refractive index $n_o$ or the extraordinary refractive index $n_e$ of the second fluid 312. Herein and throughout the rest of the specification, the term "fluid" is taken to mean a medium capable of flowing or changing shape upon application of an external force while reacting with a viscous counterforce, or a mixture of viscous and elastic counterforce, such as very viscous fluids and/or elastomers. One non-limiting example of a birefringent fluid within the meaning of this disclosure is a polymer-stabilized liquid crystal (LC). Another non-limiting example of a birefringent fluid is an LS elastomer. The first fluid 111 may be isotropic with a first isotropic refractive index, and the second fluid 112 may be an anisotropic fluid having ordinary refractive and an extraordinary refractive index. The ordinary refractive index of the second fluid may be matched to the first refractive index to e.g. within 0.1 or better, 0.05 or better, or 0.02 or better.

Figure 3B:
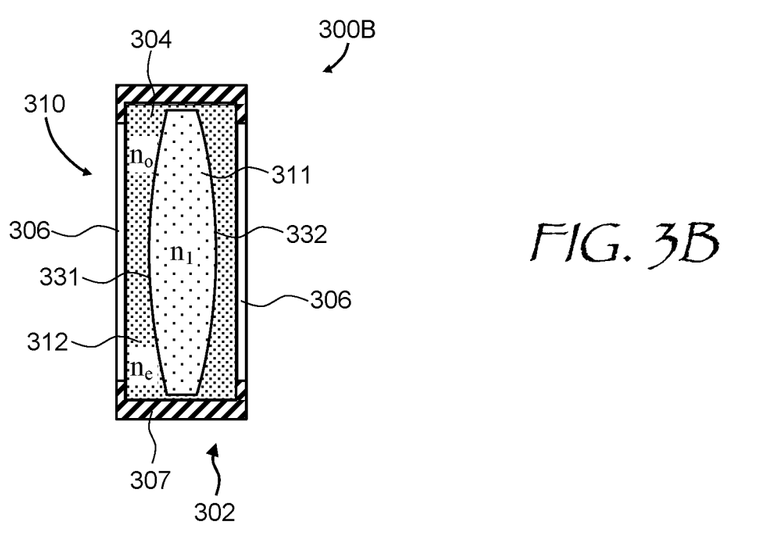
FIG. 3B is side cross-sectional view of a polarization-selective varifocal liquid lens of this disclosure including two surfaces of variable curvature, where the outside fluid is isotropic and the inside fluid is birefringent.

Turning to FIG. 3B, a varifocal liquid lens 300B is similar to the varifocal liquid lens 300A of FIG. 3A. In the varifocal liquid lens 300B of FIG. 3B, the first 311 and second 312 fluids are swapped, i.e. the second (birefringent) fluid 312 surrounds the first (isotropic) fluid 311. The principle of operation of the varifocal liquid lens 300B of FIG. 3B remains the same: for one of the two orthogonal polarization of light, the fluids are index-matched and thus no refraction of a beam propagating through the clear aperture 310 occurs, while for the other polarization, the fluids are index-mismatched and thus variable refraction occurs causing the varifocal liquid lens 300B focus or defocus light in a controllable, variable manner.

Figure 4:
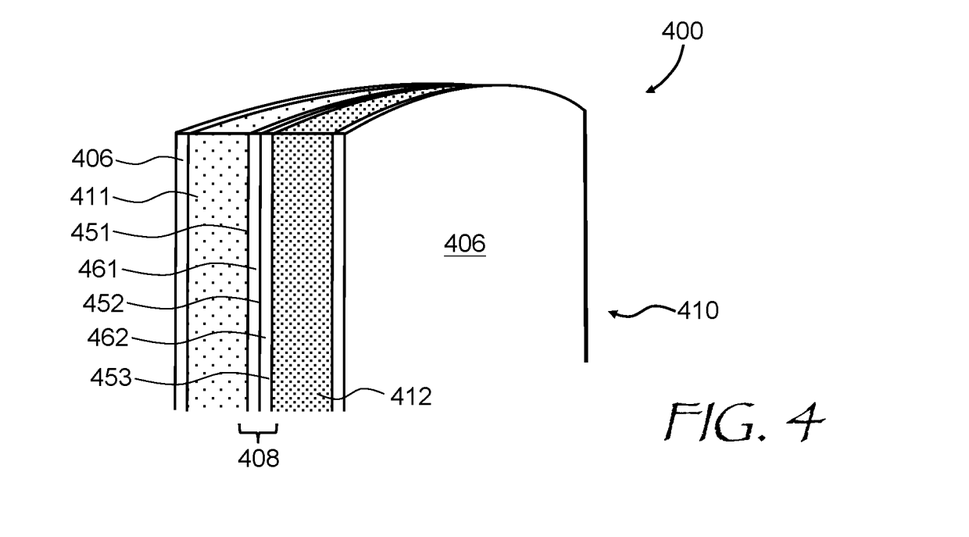
FIG. 4 is a three-dimensional sectional view of a polarization-selective varifocal liquid lens embodiment including an elastic membrane comprising an electrically responsive polymer layer.

The interface 108 (FIGS. 1A and 1B, 2A and 2B), 331 and 332 (FIGS. 3A and 3B) between the first and second fluids, or in other words the first and second liquid lens components, may include an elastic physical barrier, e.g. a transparent elastic membrane. The membrane may be made electrically responsive. Referring to FIG. 4 for example, a varifocal liquid lens 400 includes an electrically responsive transparent elastic membrane 408 separating first 411 and second 412 fluids disposed between transparent outer windows 406. The body of the varifocal liquid lens 400 is not drawn for clarity. At least one of the first 411 and second 412 fluids is birefringent. The varifocal liquid lens 400 operates similarly to the lenses 100 of FIGS. 1A and 1B, 300A of FIG. 3A, and 300B of FIG. 3B. The light enters a clear aperture 410 of the varifocal liquid lens 400 and propagates through the windows 406, both fluids 411 and 412, and the electrically responsive transparent elastic membrane 408. For one of two orthogonal polarizations of the incoming light, the first 411 and second 412 fluids are index-matched. For this polarization of the incoming light, the varifocal liquid lens 400 operates as a plano-parallel transparent slab of material. For the second, orthogonal polarization of light, the first 411 and second 412 fluids are mismatched in refractive index, and accordingly, a focusing/defocusing power (optical power) of such a lens depends on the radius of curvature of the electrically responsive transparent elastic membrane 408.

The electrically responsive transparent elastic membrane 408 includes a stack of the following transparent layers: a first electrode 451, a first material 461, a second electrode 452, a second material 462, and a third electrode 453. The first 461 and/or second 462 materials may be electrostrictive materials. When an electric field is applied to the first 461 and/or second 462 materials by means of the first 451, second 452, and/third 453 electrodes, the membrane 408 deforms, causing the optical power of the liquid lens 400 for light at the second polarization to vary.

The first 461 and/or second 462 material may include e.g. a piezoelectric material or an electrically responsive polymer, such as an electrostrictive polymer layer. The first 451 and second 452 electrodes and, for bimorph piezoelectric materials, the third electrode 453 may be, without limitation, a transparent conductive oxide such as indium tin oxide (ITO) or indium gallium zinc oxide (IGZO), or a nanowire electrode, graphene or carbon nanotube electrodes, metal electrodes, including aluminum or silver, or multilayer optical stacks of, for example, ITO and silver thin films. The electrostrictive material may be acrylate elastomer, silicone, PVDF-TrFE-CTF, and the like. Piezoelectric materials may be PVDF, PVDF-TrFE polymers, or ceramics such as PMN-PT, PZT, LiNbO3 and the like. For unimorph membranes, either of the first 461 or second 462 materials may be a passive material such as polymer, glass, or ceramic, or a combination of these materials.

Figure 5:
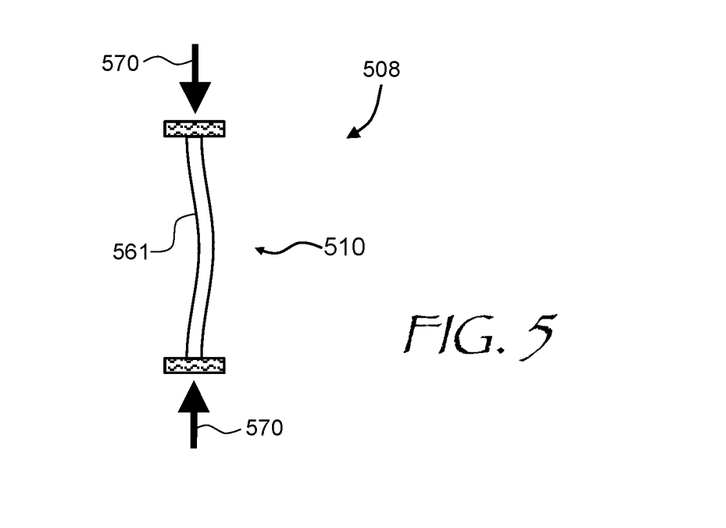
FIG. 5 is a side cross-sectional view of a membrane of a varifocal liquid lens of this disclosure changing its radius of curvature by application of mechanical force to a perimeter of the membrane.

Referring to FIG. 5, a membrane 508 of a varifocal liquid lens of this disclosure may be driven by edge actuation. To that end, the membrane 508 may include a layer 561 of an elastic transparent material extending over a clear aperture 510. A radius of curvature of the layer 561 may be changed by applying a mechanical force, e.g. a compressive force 570 to a perimeter of the layer 561. The compressive force 570 may be applied uniformly to a perimeter of the layer 56, and may be directed to a center of the clear aperture 510. A stretching force, that is a force directed to stretch the layer 561, may also be applied, e.g. it may be applied symmetrically away from the center of the clear aperture 510.

Figure 6:
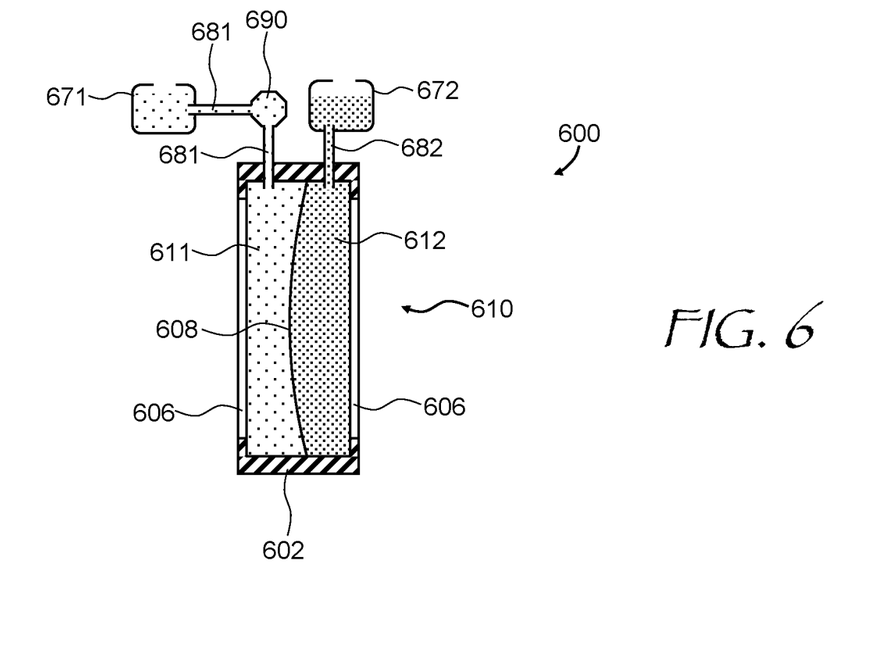
FIG. 6 is a side cross-sectional view of a polarization-selective varifocal liquid lens of this disclosure with fluid volume changing actuation.

In some embodiments, a varifocal liquid lens of this disclosure may be actuated by varying a fluid volume of the two liquid lens components. Referring to FIG. 6, a varifocal liquid lens 600 is similar to the varifocal liquid lens 100 of FIGS. 1A and 1B, and includes similar elements: a body 602 with windows 606 defining a clear aperture 610, and first 611 and second 612 fluids separated by a flexible transparent membrane 608 which, together with the windows 606, forms two adjacent liquid lens components of a compound liquid lens. A volume of the first fluid 611 may be varied by means of a pump 690 in fluid communication with a first fluid reservoir 671 by means of a first tube 681. When the volume of the first fluid 611 is increased by pumping the first fluid 611 from the first fluid reservoir 671, the flexible transparent membrane 608 expands to the left in FIG. 6, reducing its radius of curvature and pushing the second fluid 612 out via the second tube 682 into a second fluid reservoir 672. When the volume of the first fluid 611 is decreased, the radius of curvature of the flexible transparent membrane 608 is decreased. At least one of the first 611 or second 612 fluids of the varifocal liquid lens 600 is optically birefringent, such that a refractive index difference between the first 611 and second 612 fluids and resulting optical power of the varifocal liquid lens 600 is polarization-dependent. At a first polarization of light propagating through the clear aperture 610, the first 611 and second 612 fluids may be matched in refractive index, whereas at a second, orthogonal polarization of light propagating through the clear aperture 610, the first 611 and second 612 fluids may be mismatched in refractive index. Due to the polarization-dependent refractive index step in going from the first 611 to the second 611 fluid, the varifocal liquid lens 600 has a variable, non-zero optical for the second polarization of light, while having a substantially non-variable, zero optical power for the first polarization of light. More generally, the refractive index difference between the first 611 and second 612 fluids and resulting optical power of the varifocal liquid lens 600 may be polarization-dependent due to the birefringence of at least one of the first 611 or second 612 fluids, and an optical power resulting from refractive index mismatch between the first 611 and second 612 fluids at one of the two orthogonal polarizations may be offset by a curved shape of at least one of the windows 606.

Figure 7:
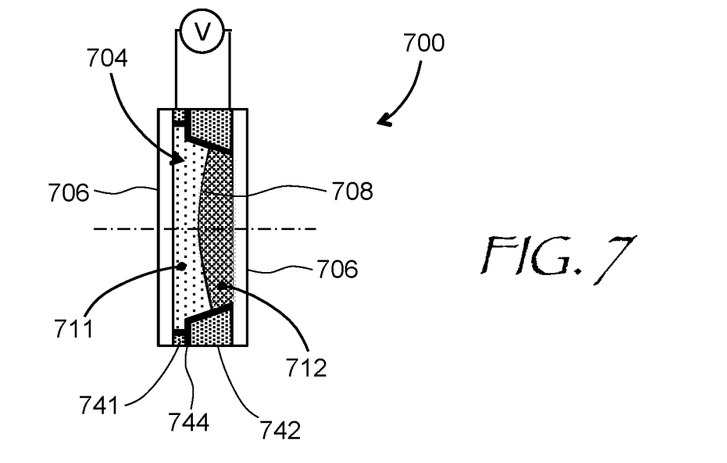
FIG. 7 a side cross-sectional view of a polarization-selective varifocal liquid lens of this disclosure with electrowetting actuation.

In configurations where the first and second fluids are immiscible, the interface may include a boundary between immiscible fluids, or in other words, the interface may be simply an inter-fluid boundary formed by surface tension at the boundary. In such lenses, the interface curvature may be controlled with the use of a phenomenon known as electrowetting. Referring to FIG. 7 as a non-limiting illustration, a varifocal liquid lens 700 includes a cavity 704 formed by first 741 and second 742 circular electrodes and a pair of windows 706. The cavity 704 includes first 711 and second 712 immiscible fluids having different indices of refraction at one polarization of impinging light and a substantially same index of refraction (e.g. less than 0.05 refractive index difference) at a second, orthogonal polarization of the impinging light. To that end, at least one of the first 711 or second 712 fluids may be birefringent. The first 711 and second 712 fluids are separated by an inter-fluid boundary 708. The first 741 and second 742 circular electrodes are electrically insulated from each other by an insulation layer 744 spanning between the first 741 and second 742 circular electrodes and shown in FIG. 7 with a thick black line. In operation, when a voltage V is applied between the first 741 and second 742 electrodes, a radius of curvature of the inter-fluid boundary 708 changes due to the electrowetting effect. Since the first 711 and second 712 fluids have different refractive indices for one of the two orthogonal polarizations of incoming light, a change of the radius of curvature of the inter-fluid boundary 708 results in a variation of optical power of the varifocal liquid lens 700. The windows 706 may be flat as shown, or at least one of the windows 706 may be curved e.g. concave or convex to compensate a slight index mismatch between the two fluids 711 and 712. In some embodiments, a flexible transparent membrane may be provided for a liquid lens for separating two media having different refractive indices.

Figure 8:
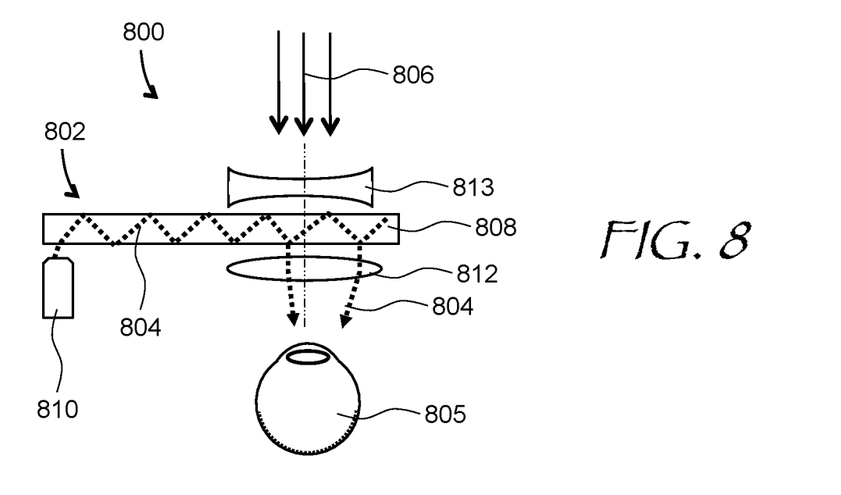
FIG. 8 is a top schematic view of a near-eye display with a pair of varifocal lenses, one upstream and one downstream of a waveguide of the display.

Referring to FIG. 8, a near-eye display device 800 includes a display module 802 for providing image light 804 to a user's eye 805 while propagating external light 806 through a pupil-replicating waveguide 808 of the display module 802. The image light 804 carries an image to be displayed by the near-eye display device 800 to the user. The display module 802 may include a projector 810 for generating the image light 804, which is coupled to the pupil-replicating waveguide 808. Such a configuration enables the generated imagery to be superimposed with the outside world view. A varifocal lens 812 is provided between the pupil-replicating waveguide 808 and the eye 805, for variably focusing the image light 804. A counter-lens 813 needs to be provided upstream of the pupil-replicating waveguide 808 for counter-acting in real time, the focusing of the external light 806 by the varifocal lens 812. This adds to weight and complexity of the near-eye display device 800.

Figure 9:
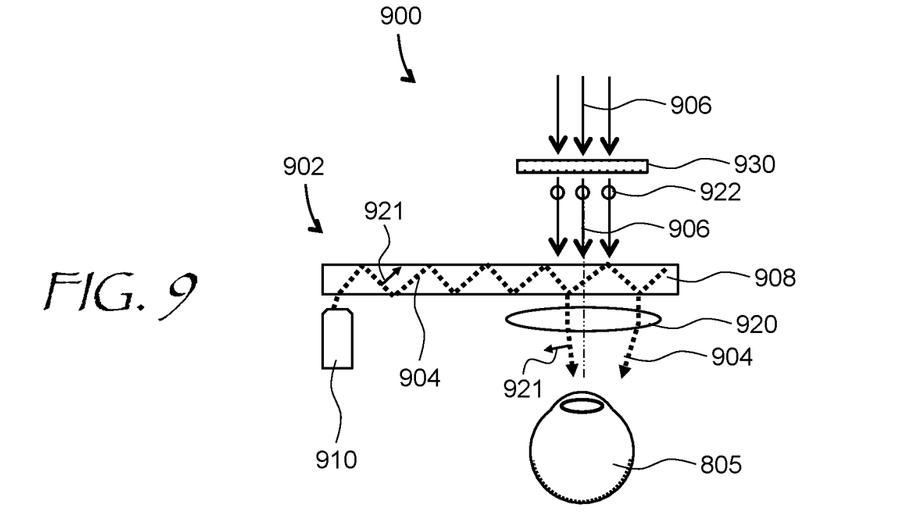
FIG. 9 is a top schematic view of a near-eye display with a varifocal polarization-selective liquid lens downstream of a waveguide of the display.

Turning now to FIG. 9, a near-eye display device 900 includes a polarization-selective display module 902 for providing image light 904 at a first polarization 921 while propagating through the polarization-selective display module 902 external light 904 at a second, orthogonal polarization 922. In the embodiment shown, the polarization-selective display module 902 includes a projector 910 coupled to a polarization-selective pupil-replicating waveguide 908.

The projector 910 generates image light 904 at the first polarization 921 carrying an image to be displayed by the near-eye display device 900. The polarization-selective pupil-replicating waveguide 908 expands the image light 904 at the first polarization 921 across an eyebox of the near-eye display device 900, while propagating through the external light 904 at the second polarization 922. A polarization-selective varifocal liquid lens 920, which may include any of the polarization-selective liquid lenses disclosed herein, is disposed in an optical path downstream of the polarization-selective display module 902, for focusing or defocusing the image light 604 at the first polarization 921 while propagating the external light 906 at the second polarization 922 substantially without focusing or defocusing.

A polarizer 930 may be provided in an optical path upstream of the polarization-selective display module 902, i.e. upstream of the polarization-selective pupil-replicating waveguide 908, for polarizing the external light 906 to have the second polarization 922. Notably, the near-eye display device 900 may be absent a lens, varifocal or otherwise, in an optical path of the external light 906 upstream of the polarization-selective display module 902, simplifying overall construction and ensuring that the outside world view is not affected by the polarization-selective varifocal liquid lens 920, regardless of its focusing power for the image light 904 at the first polarization state 921.

Figure 10:
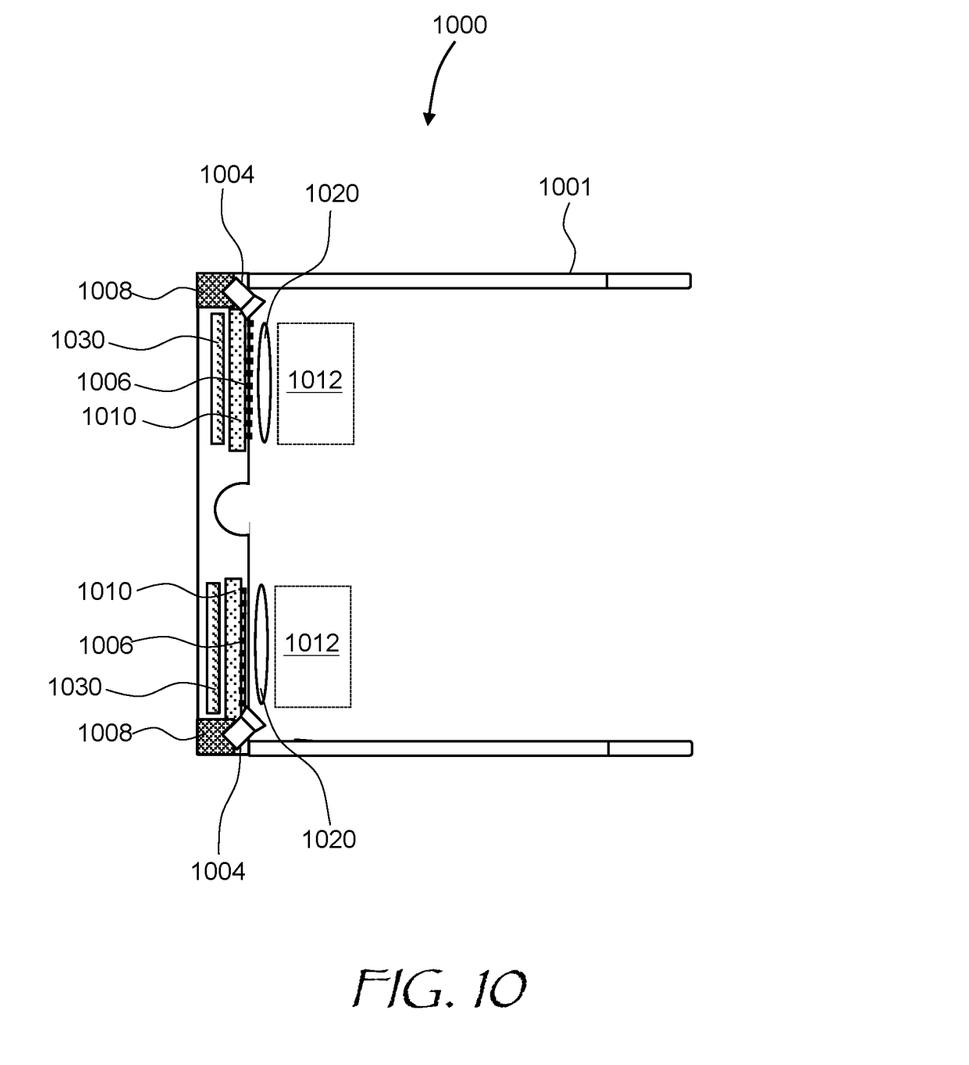
FIG. 10 is a view of an augmented reality (AR) display of this disclosure having a form factor of a pair of eyeglasses.

Turning to FIG. 10, an augmented reality (AR) near-eye display 1000 includes a frame 1001 having a form factor of a pair of eyeglasses. The frame 1001 supports, for each eye: a projector 1008 for providing polarized image light, a polarization-selective pupil-replicating waveguide 1010 optically coupled to the projector 1008, an eye-tracking camera 1004, a plurality of illuminators 1006, and a polarization-selective varifocal lens 1020 disclosed herein. The illuminators 1006 may be supported by the polarization-selective pupil-replicating waveguide 1010 for illuminating an eyebox 1012. The projector 1008 provides a fan of polarized light beams carrying an image in angular domain to be projected into a user's eye at the eyebox 1012. The polarization-selective pupil-replicating waveguide 1010 receives the fan of polarized light beams and provides multiple laterally offset parallel copies of each beam of the fan of polarized light beams, thereby extending the projected image over the eyebox 1012.

Multi-emitter laser sources may be used in the projector 1008. Each emitter of the multi-emitter laser chip may be configured to emit image light at an emission wavelength of a same color channel. The emission wavelengths of different emitters of the same multi-emitter laser chip may occupy a spectral band having the spectral width of the laser source.

In some embodiments, the projector 1008 may include two or more multi-emitter laser chips emitting light at wavelengths of a same color channel or different color channels. For AR applications, the polarization-selective pupil-replicating waveguide 1010 can be transparent or translucent for light at the other, orthogonal polarization, to enable the user to view the outside world together with the images projected into each eye and superimposed with the outside world view. The images projected into each eye may include objects disposed with a simulated parallax, so as to appear immersed into the real world view. The polarization-selective varifocal lenses 1020 may be used to focus or defocus the image light substantially without impacting the view of outside environment. To that end, polarizers 1030 may be provided in front of the polarization-selective pupil-replicating waveguides 1010 that polarize outside light at the polarization orthogonal to the polarization of the image light. For example, both polarizations can be linear orthogonal polarizations.

The purpose of the eye-tracking cameras 1004 is to determine position and/or orientation of both eyes of the user. Once the position and orientation of the user's eyes are known, a gaze convergence distance and direction may be determined. The imagery displayed by the projectors 1008 may be adjusted dynamically to account for the user's gaze, for a better fidelity of immersion of the user into the displayed augmented reality scenery, and/or to provide specific functions of interaction with the augmented reality. In operation, the illuminators 1006 illuminate the eyes at the corresponding eyeboxes 1012, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1012.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A varifocal liquid lens comprising a body filled with first and second fluids separated by a first interface therebetween, the first interface having a variable curvature across a clear aperture of the varifocal liquid lens;
wherein at least one of the first or second fluids is birefringent, such that a refractive index difference between the first and second fluids and resulting optical power of the varifocal liquid lens is polarization-dependent.

2. The varifocal liquid lens of claim 1, wherein at a first polarization of light propagating through the clear aperture, the first and second fluids are matched in refractive index, while at a second, orthogonal polarization, the first and second fluids are mismatched in refractive index, whereby the first interface between the first and second fluids has a variable, non-zero optical power for the second polarization of light while having a substantially non-variable, zero optical power for the first polarization of light.

3. The varifocal liquid lens of claim 1, wherein the first and second fluids are separated by a second interface therebetween, wherein the second interface is coaxial with the first interface and has a variable curvature across the clear aperture.

4. The varifocal liquid lens of claim 3, wherein the second fluid surrounds the first fluid, wherein the second fluid is birefringent, and the first fluid is isotropic.

5. The varifocal liquid lens of claim 1, wherein the second fluid comprises a polymer-stabilized liquid crystal (LC).

6. The varifocal liquid lens of claim 1, wherein the second fluid comprises a liquid crystal (LC) elastomer.

7. The varifocal liquid lens of claim 1, wherein the first interface comprises an elastic membrane.

8. The varifocal liquid lens of claim 7, wherein the elastic membrane comprises an electrically responsive polymer layer for changing a radius of curvature of the elastic membrane by applying an electric field to the electrically responsive polymer layer.

9. The varifocal liquid lens of claim 7, wherein the elastic membrane is configured to change its radius of curvature by application of mechanical force to a perimeter of the elastic membrane.

10. The varifocal liquid lens of claim 1, wherein the first and second fluids are immiscible, and wherein the first interface comprises a boundary between the immiscible first and second fluids.

* * * * *